Figure 1:
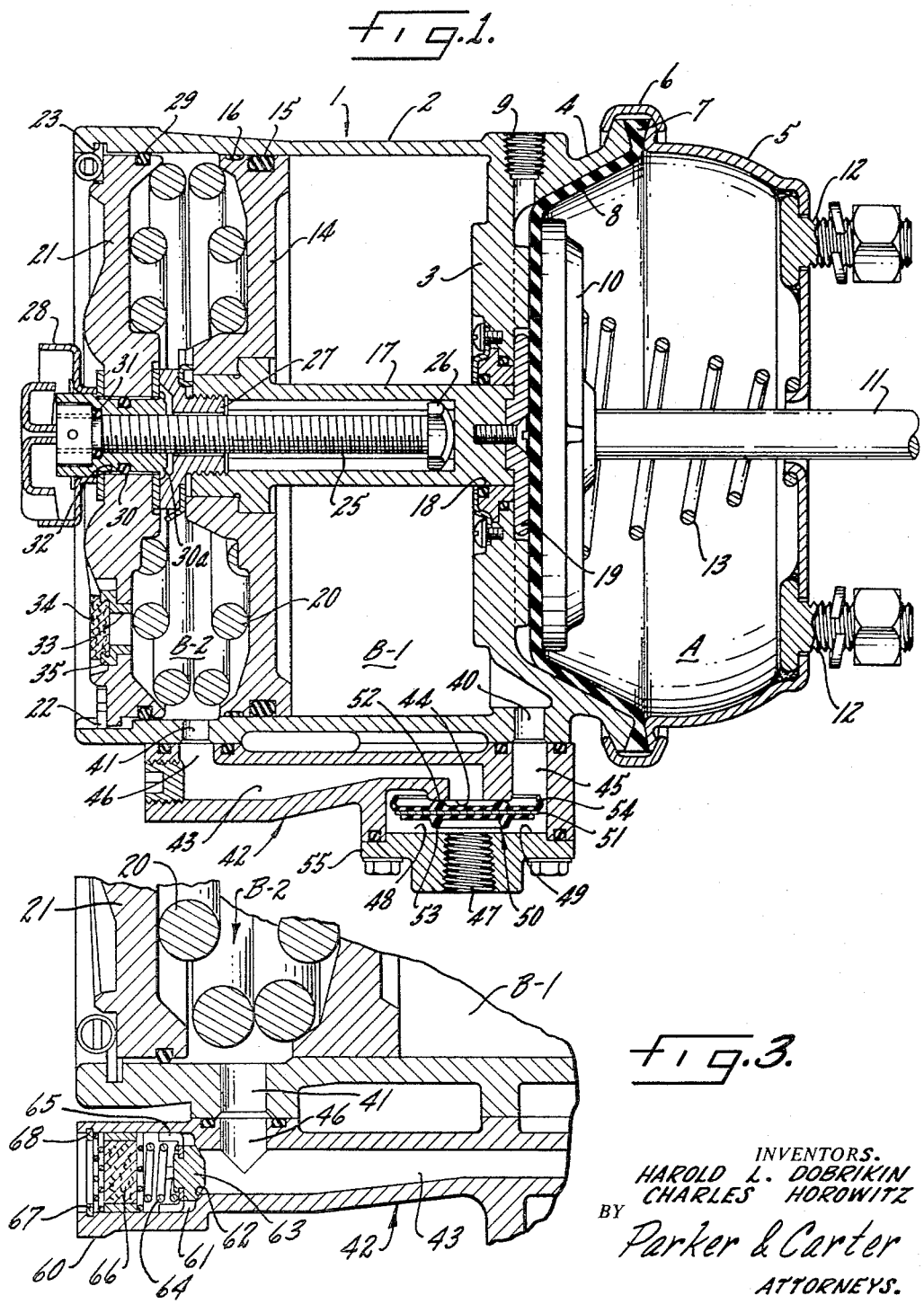

United States Patent Office 3,302,530
Patented Feb. 7, 1967

3,302,530
PRESSURIZED BRAKE CYLINDER USING INLET
PRESSURE AS A BOOST
Harold L. Dobrikin, Highland Park, and Charles Horowitz, Skokie, Ill., assignors to Berg Mfg. & Sales Co., Des Plaines, Ill., a corporation of Illinois
Filed Feb. 1, 1965, Ser. No. 429,411
5 Claims. (Cl. 91—440)

This application is a continuation-in-part of application, Serial No. 385,213, filed July 27, 1964, now abandoned and entitled "Pressurized Brake Cylinder and Method of Operating Same."

This invention relates to vehicle brake systems and has particular relation to a vehicle brake actuating mechanism.

Vehicles, such as tractor-trailer combinations, have been provided with brake actuators incorporating a service chamber and an emergency chamber. Such emergency chambers normally include a movable element held against movement by air pressure and operable in response to spring forces to apply the brakes upon diminution or loss of such holding air pressure. The movement of said movable element toward brakes- on position has resulted in the drawing in or ingress of deleterious materials which are damaging to seals and finely honed metal surfaces within the emergency actuating portion of the actuator. Flexible covering elements, such as Neoprene or rubber boots and caps, have been employed without satisfactory success in an effort to prevent the ingress of such deleterious materials. Accordingly, it is one purpose of the invention to provide a means of preventing the ingress of deleterious materials in a brake actuator.

It has been found that the provision of the means and method herein disclosed for preventing ingress of deleterious materials has resulted also in a more rapid movement of said movable element, a consequent more rapid brake application and a resultant shortening of the distance required to stop the vehicle at any given speed. It is thus another purpose of the invention to provide a means and method of increasing the speed of brake application in an emergency brake actuator.

Another purpose is to provide a means and method of employing air pressure in a brake actuator.

Another purpose is to provide a brake actuator assembly effective to transfer fluid pressures between areas on opposite sides of a movable wall.

Another purpose is to provide a brake actuator and operating method wherein fluid pressure is directed in the same direction against ingress of air or deleterious material when a movable wall is moved in either direction.

Another purpose is to provide an actuator and operating method wherein fluid pressure is alternately employed to hold a movable wall against movement in one direction and to facilitate said movement in said direction.

Another purpose is to provide an actuator wherein the same body of fluid under pressure is employed to hold a movable wall against movement and to facilitate said movement.

Another purpose is to provide a means and method of guaranteeing the presence of clean air throughout the entire internal area of a brake actuator.

Another purpose is to provide a means of maximum simplicity and economy in manufacture which shall be effective to prevent the ingress of deleterious materials into a brake actuator.

Another purpose is to provide a means for and method of operating a brake actuator.

Another purpose is to provide an actuator and valve structure effective automatically to transfer air pressure from one to the other side of a movable wall upon loss or diminution of air pressure presented to said valve.

Another purpose is to provide a brake actuator requiring no dust-excluding covering element.

Another purpose is to provide a brake actuator having a movable wall and a means and method of pressurizing the area behind said wall to insure a predetermined level of pressure therein effective to seal said area when said wall is moved.

Other purposes will appear from time to time during the course of the specification and claims.

Figure 2:
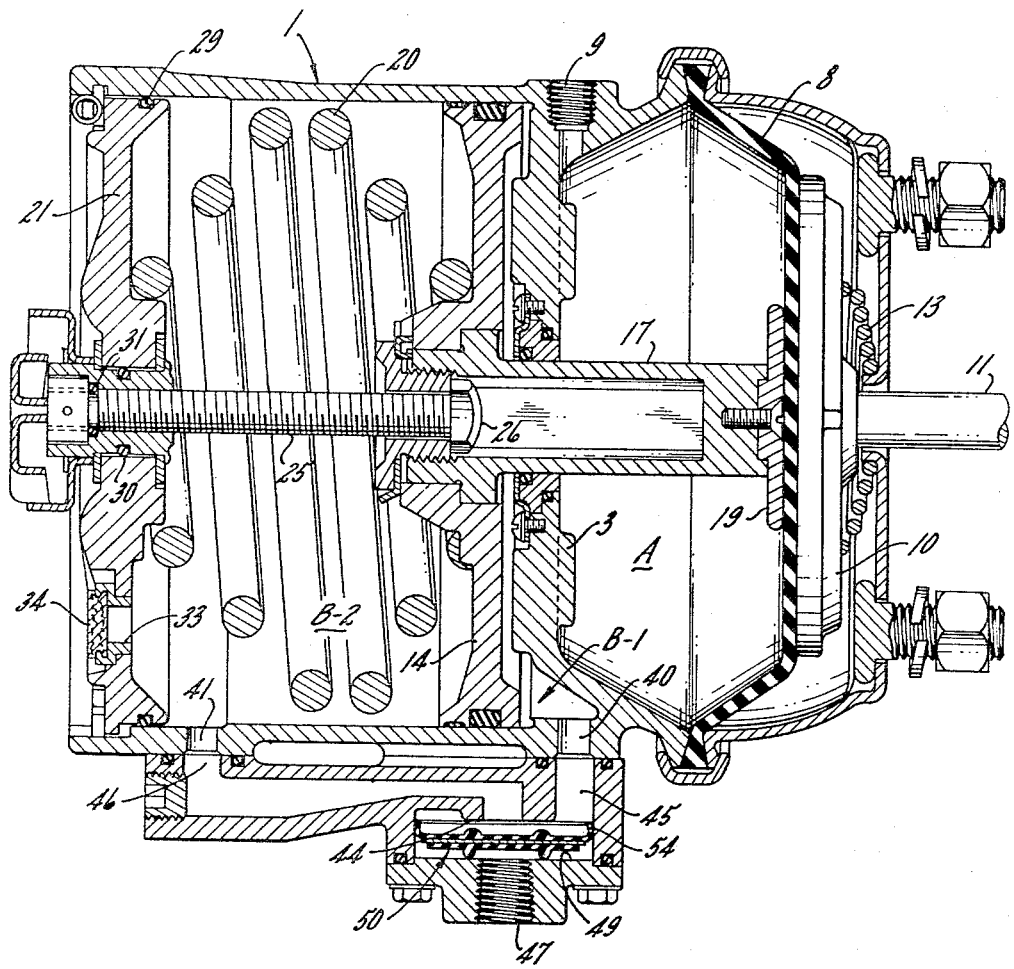

The invention is illustrated more or less diagrammatically in the accompanying drawings, wherein:

FIGURE 1 is a side elevation in partial cross-section;
FIGURE 2 is a view similar to that of FIGURE 1 showing the parts in another position; and
FIGURE 3 is a partial view illustrating a variant form of the invention.

Like parts are indicated by like numerals throughout the specification and drawings.

Referring now to the drawings, and particularly to FIGURE 1, the numeral 1 generally designates a housing. The housing 1 may conveniently comprise a cylindrical emergency chamber-forming wall 2 having a baffle wall 3 substantially closing one end, the wall 3 bearing a dish-shaped extension 4 outwardly thereof. A second dish-shaped housing portion 5 is clamped by clamp ring 6 against the peripheral portion 7 of a diaphragm 8 and against the portion 4 to form a service chamber A.

A fluid pressure inlet 9 is formed in the housing 1 for delivery of fluid pressure to one side of diaphragm 8. A pressure plate 10 is engaged by the opposite side of diaphragm 8 and carries a brake-actuating rod 11 extending outwardly from chamber A for operating engagement with the brake elements of the vehicle. The housing 1 may be suitably supported on the vehicle by fasteners, such as those shown at 12. A return spring 13 is positioned in chamber A and engages plate 10 to urge plate 10 and diaphragm 8 toward brakes-off position, as shown in FIGURE 1.

Within cylinder 2 a movable element, such as the piston 14, is mounted for reciprocation and carries seals 15, 16 in engagement with the inner surface of the cylindrical wall 2. A tubular element 17 extends from piston 14 through an opening 18 in baffle wall 3 and carries within the chamber A a head 19 for engagement with the side of diaphragm 8 with which inlet 9 communicates. A power spring 20 engages the opposite side of piston 14 from that facing baffle wall 3 and also engages a closure plate 21 held in the otherwise open end of cylinder portion 2 by suitable ring elements 22 seated within an appropriate groove 23 in the inner surface of wall 2 adjacent its open end.

A release rod 25 extends into tubular element 17 and carries a head 26 for engagement with an abutment 27 carried by piston 14, said engagement occurring in response to rotation of rod 25 by an external handle structure indicated generally at 28. A seal 29 is carried by closure plate 21 and engages the inner surface of wall 2. Seals 30, 31 are carried by a sleeve 30a and rod 25 for sealing the central aperture 32 in closure plate 21 and for sealing the rod 25 and sleeve 30a, respectively. An aperture or passage 33 is formed through closure plate 21 and a filter member 34 is carried by a fitting 35 seated within passage 33. It will be understood that a conventional ball check valve or the like could be substituted for filter 34 in passage 33 without departing from the nature and scope of the invention. In such event a suitable spring would be employable to permit automatic venting of area B–2 upon reaching a predetermined level of pressure therein.

A passage 40 is formed in wall 2 for communication with emergency chamber portion or area B–1 therein between piston 14 and baffle wall 3. A second passage 41 is formed in wall 2 for communication with emergency chamber portion or area B–2 on the opposite side of piston 14 or between piston 14 and closure plate 21.

A subhousing 42 is suitably secured, in any convenient manner, to housing 1 and has formed therein a passage 43. One end portion 45 of passage 43 communicates with passage 40. The opposite end portion 46 of passage 43 communicates with passage 41. Passage portion 46 communicates with a valve chamber 48 adjacent a central portion of the valve chamber and centrally of a valve seat 44 on one side of valve chamber 48. Passage portion 45 communicates with a peripheral segment of chamber 48 adjacent and on the side of chamber 48 at which seat 44 is positioned.

A fluid pressure inlet passage 47 communicates with chamber 48 in opposite relationship with the communication therewith of passage portion 46 and a valve seat 49 surrounds the inlet mouth of passage 47 within chamber 48.

Mounted for reciprocation within valve chamber 48 is a valve element 50. The valve element 50 includes a central strengthening disc 51, a circular valve face rib 52 positioned for seating on seat 44 and an opposed, oppositely directed valve face rib 53 positioned for seating on seat 49. A flexible peripheral portion 54 of valve member 50 slidably engages the inner cylindrical surface of chamber 48 and is bent upon itself toward or in the direction of seat 44 and passage portion 45. The chamber 48 may be conveniently formed by employment of a closure cap 55, though it will be understood that the chamber 48 could be formed in a variety of manners without departing from the nature and scope of the invention.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

In normal brake application the vehicle operator actuates a brake pedal in the vehicle cab to deliver fluid pressure through inlet 9 and against one side of diaphragm 8 and thus to move diaphragm 8, plate 10 and rod 11 towards brake-on position and to apply the brakes of the vehicle.

When the actuator of the invention is initially charged with pressure, relatively clean air from the compressor is delivered to inlet 47. Fluid pressure entering inlet 47 moves valve 50 toward and into engagement with seat 44, thus closing passage portion 46 and fluid pressure is permitted to flow past the peripheral rib 54 of valve 50 through passage portion 45 and passage 40 into the chamber area B–1 between piston 14 and baffle 3 and thus to move the movable member 14 toward brakes-off position, or to the left as the parts are shown in the drawings, and to compress power spring 20 as shown in FIGURE 1.

Upon diminution of fluid pressure in the system connected to inlet 47, the consequent reduction of fluid pressure at inlet 47 and the presence of fluid pressure within chamber area B–1, passage 40 and passage portion 45 will cause the free-floating valve 50 to be moved off its seat 44 and onto its seat 49. Thereupon fluid pressure will flow from area B–1 between members 14 and 3 through passage 40, passage portion 45, seat 44, passage portion 46 and passage 41 and thus into area B–2 on the opposite side of movable member 14. Pressure flowing into chamber portion B–2 will flow outwardly through vent passage 33 and filter 34 to atmosphere. Said pressure will also act against the rear face of movable member 14 and assist in the movement of member 14 toward brakes-on position under the influence of spring 20.

With chamber portion B–2 thus pressurized, the action of member 14 moving away from rear closure plate 21 will not produce a suction effect and will not draw air or deleterious materials into the area B–2 behind piston 14. The seals 29, 30, 31 are thus not subjected to a vacuum or suction action as a result of movement of piston 14. The seals 29, 30, 31 are effective, however, to seal area B–2 against entry from outside housing 1 throughout the period in which the member 14 remains inactive, or in the position shown in FIGURE 1, and are also effective to limit the outflow of pressure air from the area B–2 to the amount flowing through passage 33 when member 14 is moved in either direction.

Upon correction of the difficulty leading to loss of fluid pressure at inlet 47 and the subsequent redelivery of fluid pressure to inlet 47, pressure thus entering inlet 47 moves valve 50 toward and into engagement with seat 44. The fluid pressure entering inlet 47 then flows about lip 54 and through passage portion 45 and passage 40 into chamber portion B–1 to move the movable wall member 14 against the action of spring 20, to compress the spring 20 and to return the member 14 into the brakes-off position shown in FIGURE 1. Movement of member 14 toward closure plate 21, in response to delivery of fluid pressure into chamber area B–1 or otherwise, produces a flow of fluid pressure remaining in chamber area B–2 through vent passage 33 and filter 34. Thus pressure tending to move valve 50 off seat 44, as a result of said retrograde movement of member 14, is avoided and the flow of fluid pressure from chamber B–2 is outwardly through vent 33 when member 14 moves in either direction.

In addition to the prevention of ingress of deleterious materials into the emergency actuator of the invention, the delivery of fluid pressure through passage 41 when piston 14 moves toward brakes-on position is effective to aid the action of spring 20 and to speed the movement of piston 14. Tests have indicated, for example, that the movement of piston 14 with passage 41 closed requires a period of approximately .58 second. With passage 41 open and the invention operating in the manner disclosed, piston 14 has been found to complete its movement toward brakes-on position in .28 second. The consequent reduction in operating time of member 14 by more than fifty percent is effective to reduce the stopping distance of the vehicle. It has been found, for example, that a typically loaded vehicle moving at the rate of 60 miles an hour may have its stopping distance reduced as much as 6 feet through employment of the invention herein. Thus the structure and method of operating a pressure-held, spring-operated actuator is effective to prevent entry of deleterious materials, to maintain a supply of clean air throughout the actuator chamber and to speed the action of the power means therein.

While the drawings illustrate passage 33 and filter element 34 positioned in closure plate 21, it will be realized that the structure 33, 34 might, when convenient, be moved and placed in the threaded opening at one end of passage 43 in which a threaded plug is shown, thus leaving a solid plate 21, except, of course, for the central opening therein through which rod 25 extends. Similarly, while filter 34 provides a resistance to the outward flow of air pressure from the chamber B–2, it will be realized that a check valve structure could be located in either plate 21 or as a substitute for the plug shown at the end of passage 43 adjacent chamber B–2. Such check valve structure could be arranged for opening at a predetermined pressure level within chamber B–2. Thus the air pressure against the rear face of piston 14 might be set to provide a maximum assistance to spring 20 and facilitating the movement of piston 14, while permitting the escape of pressure in chamber B–2 when piston 14 is moved rearwardly toward the position shown in FIGURE 1 by pressure entering chamber B-1.

Referring, for example, to FIGURE 3, it will be observed that the exhaust passage 33, filter 34 and fitting 35 are absent from plate 21 and that plate 21 is unbroken. While FIGURE 3 is a partial view, it will be understood that the remaining elements of the structure correspond to those shown in FIGURES 1 and 2 and, for convenience and clarity, are not repeated in FIGURE 3. The structure 42 defining passage 43 includes, as shown in FIGURE 3, an end enlargement 60 which in turn defines a valve chamber 61 in axial alignment and communication with passage 43 beyond branch passage 46, 41. A check valve seat 62 is formed at the juncture of chamber 61 and passage 43 and a check valve member 63 is yieldingly urged against the seat 62 by spring 64. The check valve member 63 includes a series of circumferentially spaced legs or skirt portions 65 in sliding engagement with the inner wall of chamber 61. The spring 64 has one of its ends exerted against valve member 63 and its opposite end in engagement with an air-permeable filter plug 66 positioned in chamber 61, the area of chamber 61 beyond filter 66 being open to atmosphere. A retaining ring 67 seats within a groove 68 in the wall of chamber 61 to retain filter 66, spring 64 and valve member 63. It will be realized that the valve 63 may be set to open in response to the presence of a predetermined pressure within passage 43.

Pressure within passage 43 is, of course, equal to that within chamber B-2. If, for example, valve 63 be set to open in response to the presence of fluid pressure in passage 43 of the order of 3 pounds, it will be realized that such pressure of 3 pounds is available within chamber B-2 to pressurize the chamber B-2 against the passage of undesirable materials beyond shield 29 and into chamber B-2 as well as to assist member 14 in moving toward wall 3. If pressure should build in chamber B-2 upon return of member 14 toward the position illustrated in FIGURE 1, for example, or for any other reason, above the predetermined pressure setting of valve 63, then valve 63 will open from its seat 62 and excess pressure will be exhausted into chamber 61, past the spaced portions of skirt 65 and through filter 66 to atmosphere.

We claim:

1. A brake actuator including a housing, a movable wall dividing said housing into an air chamber and a spring chamber, an inlet in said air chamber, a first passage communicating said inlet with said air chamber, a second passage communicating said spring chamber with said air chamber through said first passage, a valve member at said inlet, said valve member being movable into a first position closing communication between said first and second passages and opening communication between said first passage and said inlet in response to air entering said inlet under a pressure greater than the pressure in said air chamber, said valve member being movable into a second position closing said inlet and opening communication between said first and second passages to communicate said air chamber with said spring chamber in response to diminution of pressure at said inlet below the pressure in said air chamber, and means exhausting air above a predetermined pressure from said spring chamber to atmosphere.

2. The structure of claim 1 wherein said valve member includes a valve face on each of the opposite sides thereof and a peripheral valve lip, and said housing includes a first valve seat surrounding said inlet and a second valve seat surrounding the point of communication of said first and second passages, said valve lip permitting flow of air from said inlet to said first passage and precluding flow of air from said first passage to said inlet, one of said valve faces seating on said second valve seat when said valve member is in said first position, the other of said valve faces seating on said first valve seat when said valve member is in said second position.

3. A brake actuator including a housing, a brake actuating, movable wall in said housing defining therein closed pressure and biasing chambers each having an outlet and inlet passage means defined therein, a portion of the passage means from the biasing chamber defining an outlet passage for said pressure chamber and the inlet passage for the biasing chamber on the opposite side of said movable wall, the outlet from the biasing chamber being open to atmosphere when said chamber is pressurized, means disposed in that chamber for biasing said movable wall toward the opposite chamber, valve means controlling the inlet passage to each of said chambers and the outlet passage for the pressure chamber, said valve means being movable to a first position in response to inlet pressure whereby said movable wall is biased against said biasing means, said valve means being automatically moved to close said inlet to said pressure chamber and open the inlet to the chamber containing said biasing means in response to a drop in inlet pressure, whereby said inlet pressure from said previously charged chamber is transferred undiminished to said atmospherically vented biasing chamber to impart additional biasing forces to said movable wall prior to exhausting to atmosphere through the outlet in said chamber, so that the actuator moves to brakes on position in response to movement of said actuating wall upon a drop in inlet pressure, said brakes being released only upon restriction of inlet pressure to its initial value accompanied by movement of said valve to return said movable wall to the brakes off position.

4. A brake actuator comprising a housing and a movable brake actuating wall dividing said housing into an air chamber and an atmospherically vented spring chamber, a biasing spring in said chamber, an inlet and a first passage communicating said inlet with said air chamber, a second passage communicating said spring chamber with said air chamber through said first passage, said first passage defining a valve chamber, a differential pressure valve member disposed in said valve chamber and movable in response to predetermined pressure at said inlet to place said inlet in communication with said air chamber and to close said second-mentioned passage, said valve means acting in response to a diminution of inlet pressure from a predetermined value to close said first passage and to open said second passage whereby said movable wall is biased completely into said air chamber by a combination of full inlet pressure and spring pressure, the inlet pressure simultaneously venting to atmosphere whereby said wall remains spring biased until inlet pressure to the predetermined value is restored to the air chamber and said valve is returned to its initial closing position.

5. An emergency brake actuator for vehicles having pressure applied brakes including a brake operator means operable normally independently of said actuator at a predetermined pressure but operated by said emergency brake actuator in response to low pressure in the brake system, said emergency brake actuator means comprising a closed housing divided into chambers by means of a slidable piston, inlet and outlet means in the respective chambers, one of which chambers comprises a spring housing, the other of which chambers comprises a pressure chamber, a spring in said spring housing biasing said piston to a brakes on position, a source of pressure in communication with said pressure chamber via said inlet means therein whereby said piston is pressure biased to a brakes off position at a preselected pressure value, valve means between said source and said inlet, said valve means opening said inlet to said source and maintaining said pressure source and said pressure chamber in continual communication so long as the pressure remains at said predetermined value, said valve being moved by an unbalance of pressure between said chamber and said source, in favor of said chamber pressure, to a position closing said chamber to said source while uncovering the outlet in said pressure chamber and the inlet to said brake chamber whereby as the spring bias on said piston moves same to brakes on position, the pressure in said pressure chamber is simultaneously transferred to said spring chamber at above atmospheric pressure until movement of said piston is terminated and thereafter the spring chamber pressure reaches atmospheric pressure.

References Cited by the Examiner

UNITED STATES PATENTS

| | | | |
|---|---|---|---|
| 189,147 | 4/1877 | Taylor | 303—71 |
| 860,946 | 7/1907 | St. Clair | 303—2 |
| 1,548,394 | 8/1925 | Sumner | 303—71 X |
| 2,179,179 | 11/1939 | Fischel | 91—437 |
| 2,283,826 | 5/1942 | Soehner | 91—52 |
| 2,729,228 | 1/1956 | Stevenson | 137—550 |
| 2,854,954 | 11/1958 | Howze | 92—64 X |
| 2,980,136 | 4/1961 | Krehbiel | 91—436 |
| 3,020,094 | 2/1962 | Murty | 303—9 |
| 3,093,153 | 6/1963 | Horowitz | 137—102 |

EDGAR W. GEOGHEGAN, *Primary Examiner.*

SAMUEL LEVINE, *Examiner.*

MARTIN P. SCHWADRON, P. T. COBRIN,
          *Assistant Examiners.*